3,281,504
PHOSPHORAMIDATES AND PHOSPHOR-AMIDOTHIOATES

Etcyl H. Blair and Joseph L. Wasco, both of Midland, Mich., assignors to The Dow Chemical Company, Midland, Mich., a corporation of Delaware
No Drawing. Filed Nov. 8, 1965, Ser. No. 506,892
6 Claims. (Cl. 260—940)

This invention is directed to organic chemistry and is directed in particular to the phosphoramidates and phosphoramidothioates of the formula

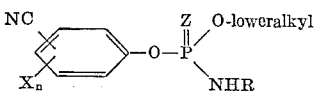

In the above and succeeding formulae, X represents halo or methyl; Z represents oxygen or sulfur; R represents hydrogen or loweralkyl; and $n$ represents an integer of from 0 to 1, inclusive. In the present specification and claims, the expression "halo" is employed to refer only to bromo or chloro, and the experssion "loweralkyl" is employed to refer only to alkyl radicals being of from 1 to 4 carbon atoms, inclusive, and having at least one hydrogen atom bonded to the α-carbon atom of each such radical.

These novel compounds are liquid or crystalline solid materials which are somewhat soluble in many common organic solvents and of very low solubility in water. The compounds are useful as parasiticides and are adapted to be employed as active toxic constituents of compositions for the control of various insect, arachnid, helminth, bacterial, fungal, and other organisms, such as, for example, Mexican bean beetle, *Tetranychus bimaculatus,* southern army worm, house fly, daphnia, plum curculio, pinworms, tapeworms, lone star tick, *Tribolium confusum,* American cockroach, cotton leaf perforator, *Aspergillus terreus, Pullularia pullulans,* and *Rhizopus nigricans.* They are also useful as rodenticides and as molluscicides.

When the present compounds are employed as pesticides, and in particular as insecticides and acaricides, the residue thereof that remains continues to be active. This is unexpected of organic phophorus pesticides. These compounds are of particular advantage in that this residue remains active for only a limited period of time, such as from about 1 to about 3 weeks. Thus, by suitable timing of application, the materials can be employed to gain the advantages of both a persisting, residual material, and a material which, after performing its function, leaves no toxic residue.

The compounds of the present invention are prepared by either of two methods. In one method, the compounds are prepared by reacting together an O-loweralkyl phosphoramidochloridate or phosphoramidochloridothioate corresponding to the formula

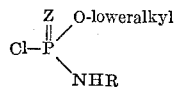

with a cyanophenol compound of the formula

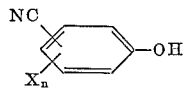

The reaction is carried out in the presence of an acid binding agent, such as, for example, an alkali metal hydroxide, alkali metal carbonate, or an organic tertiary amine, and conveniently in an inert organic liquid such as acetone, benzene, carbon tetrachloride, chloroform, toluene, diethyl ether, methylene dichloride, or dimethylformamide.

Alternately, in employing this method to prepare the compounds of the present invention, an alkali metal salt of the cyanophenol compound is reacted with the O-loweralkyl phosphoramidochloridate or phosphoramidochloridothioate compound. In such embodiment, the reaction is carried out in the absence of acid binding agent.

In either embodiment, the amounts of the reactants to be employed are not critical, some of the desired product being obtained when employing the reactants in any proportion. The reaction consumes the reactants in amounts which represent equimolecular proportions of O-loweralkyl phosphoramidochloridate or phosphoramidochloridothioate compound, cyanophenol compound and acid binding agent, or equimolecular proportions of O-loweralkyl phosphoramidochloridate or phosphoramidochloridothioate compound and alkali metal salt of cyanophenol compound, and the use of amounts which represent such proportions is preferred.

The reaction takes place smoothly at temperatures of from 0 to 100° C., and preferably at temperatures of from 10 to 65° C., with the production of the desired product and chloride of reaction. This chloride appears in the reaction mixture as the chloride salt of the alkali metal, or as the hydrogen chloride salt of the organic tertiary amine binding agent, such as triethylamine hydrochloride, or pyridine hydrochloride.

In carrying out the reaction, the reactants are mixed and contacted together in any convenient fashion, and the resulting mixture maintained for a period of time in the reaction temperature range to complete the reaction. Following the completion of the reaction, the reaction mixture can be washed with water and any organic reaction medium removed by fractional distillation under reduced pressure to obtain the desired product as a residue. This product is further purified, if desired, by conventional procedures such as, for example, washing with water and dilute aqueous alkali metal hydroxide, or extraction with various organic solvents.

In an alternative method of preparing the compounds of the present invention, an O-cyanophenyl phosphorodichloridate or phosphorodichloridothioate compound having the formula

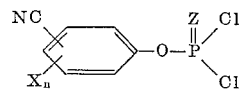

is reacted with a loweralkanol compound of the formula

HO-loweralkyl to prepare an immediate O-loweralkyl O-cyanophenyl phosphorochloridate compound of the formula

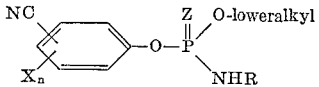

and hydrogen chloride byproduct. The reaction can be carried out in the presence of an acid binding agent, such as described in the first method of synthesis; however, the reaction can also be carried out in the absence of acid binding agent when the reaction is conducted under subatmospheric pressure; in this latter instance, the hydrogen chloride of reaction is removed from the reaction mixture by evaporation.

The reaction is conveniently carried out in the presence of an inert organic liquid, such as, for example, benzene, toluene, diethyl ether, and methylene dichloride. The reaction goes forward at temperatures at which hydrogen chloride is evolved, conveniently, at temperatures of from −10 to 100° C., with the production of the intermediate and hydrogen chloride, which, in the instance wherein an acid binding agent is employed, appears in the reaction mixture as an alkali metal chloride or as a hydrochloride salt of an organic tertiary amine.

The intermediate is thereafter reacted with ammonia or with a loweralkylamine to produce the desired product of the present invention. The reaction is conveniently carried out in the presence of an inert organic liquid, at temperatures at which hydrogen chloride is evolved, conveniently at temperatures of from −20 to 50° C., and in the presence of acid binding agent. Suitable acid binding agents include alkali metal hydroxide and, preferably, an excess amount of the ammonia or loweralkylamine compound employed as reactant. As a result of these operations, there is obtained the desired product compound of the present invention and alkali metal chloride or hydrochloride salt of the ammonia or loweralkylamine reactant. The product is separated and purified in conventional procedures. The following examples illustrate the invention but are not to be construed as limiting.

*Example 1.—O-(para-cyanophenyl) O-methyl isopropylphosphoramidothioate*

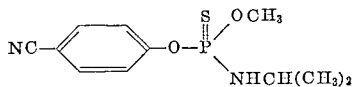

p-Cyanophenol (15 grams; 0.13 mole) was dispersed in 200 milliliters of chloroform which was inhibited by the addition thereto of pentene. To the resulting dispersion was added successively 14 grams of triethylamine (0.19 mole) and 25 grams of O-methyl isopropylphosphoramidochloridothioate (0.13 mole). The addition was carried out at room temperature, and the resulting reaction mixture was heated at a temperature of about 64° C. for a period of 3 hours, with continuous stirring. At the end of the period, the heated reaction mixture was permitted to cool to room temperature, washed with water to remove chloride of reaction, and thereafter washed with 100 milliliters of a 25 percent solution of sodium hydroxide to remove unreacted p-cyanophenol and unreacted O-methyl isopropylphosphoramidochloridothioate. The reaction mixture was then washed several additional times with water and dried in the presence of anhydrous calcium sulfate. The dried reaction mixture was filtered and solvent removed from the filtrate by evaporation under subatmospheric pressure to obtain the O-(p-cyanophenyl) O-methyl isopropylphosphoramidothioate product as an oil having a refractive index $n$ measured at 25° C. for the D line of sodium light of 1.5423, and having a density measured at 25° C., and compared with the density of water at 4° C., of 1.1996.

*Example 2.—O-(4-cyano-2-chlorophenyl) O-n-butyl ethylphosphoramidate*

To a first mixture of about 27.0 grams of O-(4-cyano-2-chlorophenyl) phosphorodichloridate (0.1 mole) in 228 milliliters of carbon tetrachloride, was added portionwise over a period of 1 hour, a second mixture of 7.4 grams of n-butyl alcohol (0.1 mole) in 30 milliliters of carbon tetrachloride.

The addition was carried out at subatmospheric pressures of 200–250 millimeters of mercury and at a temperature of about 25° C., and the reaction mixture was agitated. Following the completion of the addition, the reaction mixture was maintained under these same reaction conditions of temperature, pressure, and agitation for an additional period of 2 hours.

The reaction mixture was thereafter restored to atmospheric pressure, and ethylamine (13.1 grams; 0.3 mole) was added to the reaction mixture portionwise over a period of about 10 minutes, such that the temperature of the reaction mixture did not rise above 40° C. After the addition was complete, the reaction mixture was warmed to a temperature of 35° C. and maintained at that temperature, with continuous stirring, for 1 and ½ hours. Thereafter, the reaction mixture was filtered, and carbon tetrachloride removed from the filtrate initially by distillation under subatmospheric pressure and later by drying, with slight warming, in subatmospheric pressure. The product has a molecular weight of 316.5 and is an oil.

In similar procedures, other compounds of the present invention are prepared of which the following are representative:

O-(p-cyanophenyl) O-ethyl phosphoramidothioate (molecular weight of 242.2) by reacting together the sodium salt of p-cyanophenol and O-ethyl phosphoramidochloridothioate;

O-(4-cyano-2-methylphenyl) O-methyl isopropylphosphoramidate (melting at 74–80° C.) by reacting 1 molecular proportion of O-(4-cyano-2-methylphenyl) phosphorodichloridate successively with 1 molecular proportion of methanol under subatmospheric pressure, and with 2 molecular proportions of isopropylamine;

O-(4-cyano-3-bromophenyl) O-methyl methylphosphoramidothioate (molecular weight of 321.2) by reacting together 4-cyano-3-bromophenol and O-methyl methylphosphoramidochloridothioate;

O-(o-cyanophenyl) O-methyl methylphosphoramidate (molecular weight of 226.2) by reacting O-(o-cyanophenyl) phosphorodichloridate successively with methanol and with methylamine;

O-(4-cyano-2-chlorophenyl) O-methyl methylphosphoramidate (melting at 115–116° C.) by reacting together the sodium salt of 4-cyano-2-chlorophenol with O-methyl methylphosphoramidochloridate;

O-(3-cyano-5-methylphenyl) O-isopropyl secondary-butylphosphoramidate (molecular weight of 310.3) by reacting together 3-cyano-5-methylphenol and O-isopropyl secondary-butylphosphoramidochloridate;

O-(o-cyanophenyl) O-methyl n-propylphosphoramidate (melting at 170–179° C.) by reacting O-(o-cyanophenyl) phosphorodichloridate successively with methanol and with n-propylamine;

O-(2-cyano-4-chlorophenyl) O-n-propyl isobutylphosphoramidothioate (molecular weight of 346.8) by reacting together 2-cyano-4-chlorophenol and O-n-propyl isobutylphosphoramidochloridothioate;

O-(p-cyanophenyl) O-methyl methylphosphoramidate (a liquid material having a molecular weight of 226.2) by reacting O-(p-cyanophenyl) phosphorodichloridate successively with methanol and with methylamine;

O-(m-cyanophenyl) O-methyl phosphoramidothioate (molecular weight of 228.2) by reacting together the sodium salt of m-cyanophenol and O-methyl phosphoramidochloridothioate;

O-(4-cyano-3-chlorophenyl) O-methyl methylphosphoramidothioate (molecular weight of 276.7) by reacting together the sodium salt of 4-cyano-3-chlorophenol and O-methyl methylphosphoramidochloridothioate; and O-(p-cyanophenyl) O-methyl methylphosphoramidothioate (molecular weight of 242.2) by reacting together the sodium salt of p-cyanophenol and O-methyl methylphosphoramidochloridothioate.

When the present compounds are employed as parasiticides, the unmodified compounds can be used. However, the present invention also encompasses the use of a compound together with a parasiticide adjuvant. In such use, the compound can be dispersed upon a finely divided solid and the resulting preparation employed as a dust. Also, such mixture can be dispersed in water with the aid of a wetting agent and the resulting aqueous suspension employed as a spray. In other procedures, the products can be employed as constituents of organic liquid compositions, or oil-in-water or water-in-oil emulsions or dispersions, with or without the addition of wetting, dispersing or emulsifying agents.

In representative operations, O-(p-cyanophenyl) O-methyl isopropylphosphoramidothioate was employed to prepare an aqueous dispersion containing 100 parts of the compound, as sole active toxicant, per million parts by weight of ultimate dispersion. A stand of young cranberry bean plants was thoroughly wetted briefly with the dispersion, the wetted plants permitted to dry, and 5 live *Epilachna varivestis* larvae placed on each plant of the stand. In identical operations, 5 live *Epilachna varivestis* larvae were placed on each plant in a control stand of untreated young cranberry bean plants. Each of the stands was maintained for a period of about 6 days under conditions favorable to the growth of the larvae. At the end of the 6-day period, all of the plants were examined; in the treated stand, there was found, calculated according to Abbott's formulae, a 100 percent kill and control of *Epilachna varivestis,* while a thriving population of live *Epilachna varivestis* larvae continued to feed on the plants of the control stand.

The O-(cyanophenyl) phosphorodichloridates employed as starting materials in the preparation of the compounds of the present invention are prepared in known procedures. In such procedures, a cyanophenol compound of the formula

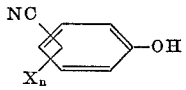

is reacted with phosphorylchloride or thiophosphorylchloride, having, respectively, the formulae

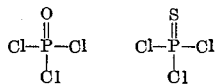

The reaction is carried out in the presence of an inert liquid reaction medium, such as, for example, benzene, toluene, diethyl ether, chloroform, and the like, and in the presence of an acid binding agent, such as, for example, an organic tertiary amine such as triethylamine or pyridine. The amounts of the reactants employed are not critical; however, it is preferred to employ equimolecular proportions of cyanophenol compound and phosphoryl chloride or thiophosphoryl chloride. The reactants and acid binding agent are contacted together in any convenient manner. Some of the desired product is prepared immediately upon the contacting of the reactants; however, improved yields result when the reaction mixture is permitted to stand for a period of time. Upon the completion of the reaction, the product is separated and purified by conventional procedures.

We claim:
1. Compound of the formula

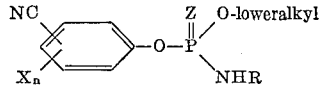

wherein X represents halo or methyl; Z represents oxygen or sulfur; R represents hydrogen or loweralkyl; and $n$ represents an integer of from 0 to 1, inclusive.

2. Compound of claim 1 wherein each of R and loweralkyl represents methyl, Z represents oxygen; $n$ represents the integer 0, and the NC— group is located at the para position.

3. Compound of claim 1 wherein R represents ethyl, loweralkyl represents n-butyl, Z represents oxygen; $n$ represents the integer 1, the NC— group is located at the 4 position, and X represents chloro and is located at the 2 position.

4. Compound of claim 1 wherein each of R and loweralkyl represents methyl, Z represents sulfur, $n$ represents the integer 1, the NC— group is located at the 2 position, and X represents chloro and is located at the 4 position.

5. Compound of claim 1 wherein R represents isopropyl, loweralkyl represents methyl, Z represents oxygen, $n$ represents the integer 1, the NC— group is located at the 4 position, and X represents methyl and is located at the 2 position.

6. Compound of claim 1 wherein R represents isopropyl, loweralkyl represents methyl, Z represents sulfur, $n$ represents the integer 0, and the NC— group is located at the para position.

No references cited.

CHARLES B. PARKER, *Primary Examiner.*

FRANK M. SIKORA, *Assistant Examiner.*